June 19, 1951     H. C. SCHUTT     2,557,569
PYROLYSIS FURNACE

Filed Feb. 14, 1948     3 Sheets-Sheet 3

COOLANT

INVENTOR
HERMANN C. SCHUTT
BY
Morgan, Finnegan + Durham
ATTORNEYS.

Patented June 19, 1951

2,557,569

UNITED STATES PATENT OFFICE 2,557,569

PYROLYSIS FURNACE

Hermann C. Schutt, Framingham Center, Mass., assignor to Stone & Webster Engineering Corporation, Boston, Mass., a corporation of Massachusetts Application February 14, 1948, Serial No. 8,371

17 Claims. (Cl. 196—110)

This invention relates to furnaces for the pyrolytic treatment of fluid organic substances and has particular application to the pyrolytic treatment of hydrocarbon fluids for the production of olefines.

The accompanying drawings, referred to herein and constituting a part hereof, illustrate one embodiment of the apparatus for carrying out the process of the invention, and together with the description, serve to explain the principles of the invention.

Objects of this invention are to enable the heating of a fluid or fluids in separate streams to treating temperatures appropriate to each stream and ensure the prevention of any undesired sharp temperature rises at these temperatures, through the provision of a new and improved pyrolysis furnace which combines high thermal efficiency, capacity and flexibility with compactness, in a novel cellular design which readily lends itself to extension and enlargement.

Another object of this invention is to effect the proper balance between convection and radiant heating surface in a pyrolysis furnace embodying both a low temperature convection heating zone and a high temperature radiant heating zone and, at the same time, obtain a high furnace efficiency, by removing heat from the flue gases leaving the high temperature radiant heating zone, through the provision of a system of coolant tubes forming a convection shield bank between the radiant and convection heating zones.

A further object of this invention is to prevent partial or complete structural failure or collapse of the supports for tubular heating elements in a high temperature radiant heating zone under conditions of even heat intensity on the heating surface, circumferentially and longitudinally, of the elements, by maintaining the supports at a safe operating temperature, through the provision of a new and improved tube support system adapted for the passage of a coolant fluid therethrough which is preferably thence flowed through the convection shield bank.

Another object of this invention is to attain as high a degree of furnace efficiency as possible, by recovering all heat absorbed by the coolant fluid through the provision of a suitable external circulating system in which the coolant fluid may be caused to generate steam directly or indirectly or be used for heating distillation columns and other apparatus.

Another object of this invention is to obtain structural stability of the setting and tube supports of a pyrolysis furnace embodying an extremely hot radiant heating zone by creating a relatively cool section at the top of the radiant heating zone through the provision of the aforementioned convection shield bank, and by flexibly anchoring the system of radiant tube supports at its top through the provision of reliable means of fixation disposed in said relatively cool section and operative to permit vertical movement of the top of the system while preventing horizontal or gyratory movement of the top of the system.

Another object of this invention is to obtain mechanical stability in and long service life of a refractory heat radiating wall partitioning adjacent combustion chambers from each other in a cellular furnace in accordance with this invention, by cooling the interior of the wall without at the same time lowering the temperature of its flame swept emission surfaces below the temperature of the opposite emission surfaces and below that at which their effectiveness as heat radiating surfaces would be materially reduced, through the provision of a double wall construction of the partition permitting a stream of cooling air to be positively induced through the dividing space by the draft in the furnace flue which, in turn, is produced by the stack; the stream of cooling air being quantitatively appropriate for cooling the interior faces of the wall to the extent stated, and being quantitatively controlled by an adjustable damper at the air intake, and the pressure in the dividing air space being regulated by a suitable damper in the connection to the flue, so that the average pressure differential between combustion chamber and air space may also be maintained very small and preferably essentially equal on both sides of the refractory partition, thus avoiding any filtration of gases in either direction.

Figure 1:
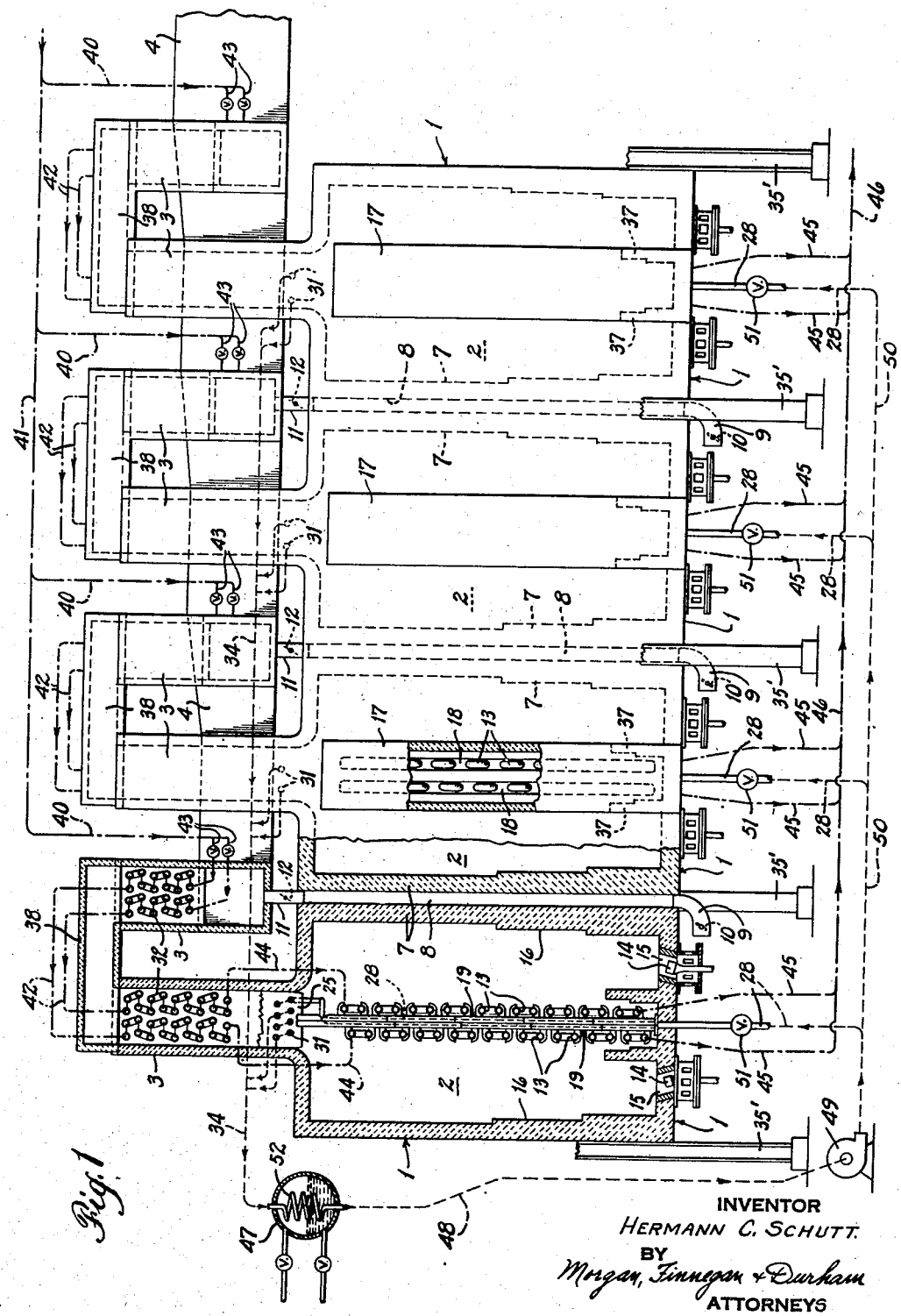
Figure 1 is a view in end elevation, partly sectional and partly diagrammatic, of a typical and illustrative embodiment of a multi-cell pyrolysis furnace in accordance with this invention, the view omitting details of the steel supporting framework for clarity.
Figure 2:
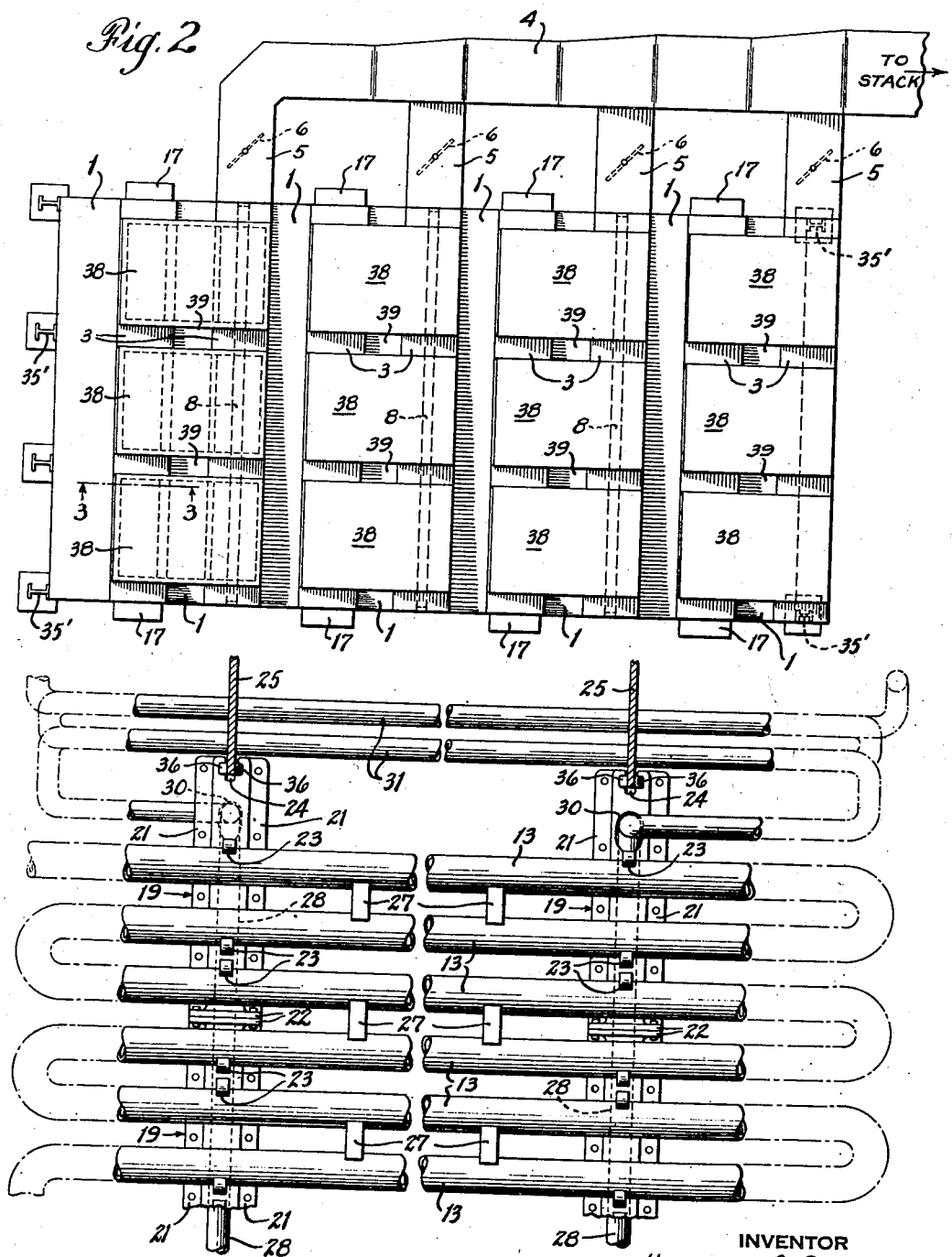
Figure 2 is a view in top plan of the embodiment shown in Figure 1.
Figure 3:
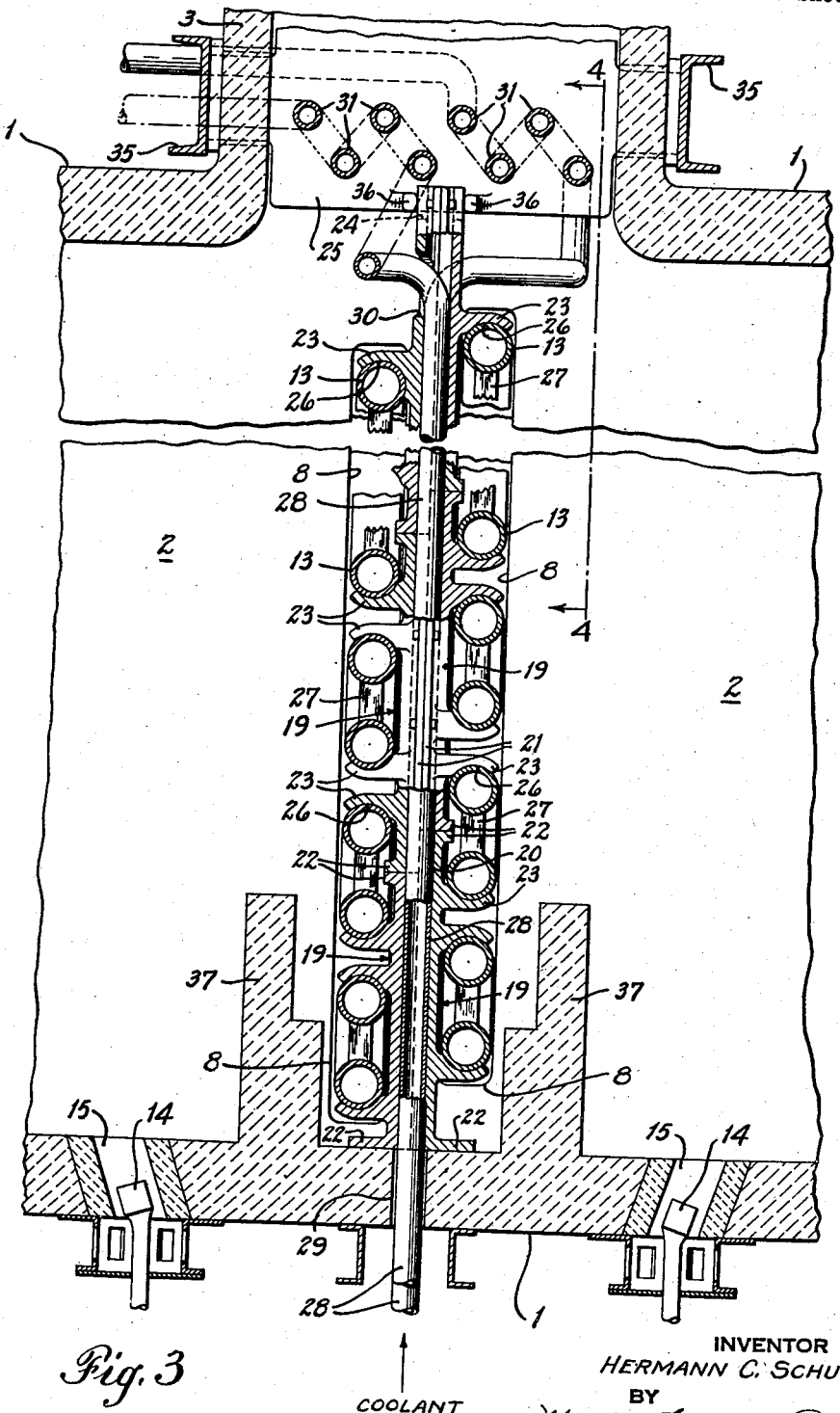

Figure 3 is a fragmentary view in sectional elevation and on an enlarged scale of the embodiment of Figure 1 taken approximately on the line 3—3 of Figure 2 showing in particular the construction and arrangement of the cooled supports for the radiant tube bank and of the cooling system associated therewith; and, Figure 4 is a view in side elevation, partly fragmentary, taken along the line 4—4 of Figure 3.

In accordance with the illustrative embodiment of this invention, a plurality of unitary heating cells 1 arranged in side-by-side relationship, row fashion, are structurally integrated as hereinafter described into a complete furnace unit. This arrangement offers great flexibility in that it lends itself to extension and enlargement since as many cells may be provided, or may be added to the unit, as are necessary to provide the desired treating capacity, having regard both to the amount of fluid to be processed and to the need at times of processing several streams of fluid under different conditions, at the same time and in the separate cells. Moreover the arrangement permits of the removal from operation of any cell for repair, reconditioning, replacement of catalyst, or the like without interference with the independent operation of any other cell. The outer walls of the heating cells 1 are each internally faced with refractory material and externally faced with heat insulating material, and each cell is of a construction and configuration providing an upright, but relatively narrow, combustion chamber 2 of substantially rectangular configuration in vertical cross-section, as best shown in Figure 1; and, preferably of substantially greater length than width, as best shown in Figure 2. Each heating cell 1 is provided also with a superstructure forming a folded flue 3 having a left-hand and a right-hand leg as viewed in Figure 1, leading from the top of the combustion chamber. Products of combustion are discharged from the top of each chamber through its flue 3 each of which in turn discharges the products into a common header 4 of a stack (not shown), through a connecting duct 5. An adjustable damper 6 is provided in each connecting duct for controlling the draft in the respective combustion chambers.

Partition walls 7 of refractory material separate the combustion chambers 2 of adjacent cells from each other. Each such partition wall is adapted to be bathed in flame and is preferably corbelled to provide a progressively greater thickness from its top toward its bottom where firing takes place and the heating is greatest, the corbelling having the additional purpose of extending or drawing out the flame, upwardly of the wall surface. An air passage 8 is centrally located in each such wall and extends over substantially the full length and height of the wall. Air is adapted to be admitted to each such passage 8 at the bottom through separate air intake ducts 9, one for each passage, each preferably coextensive in length therewith. Each such duct 9 is provided with an adjustable damper 10 for controlling the quantity or volume of cooling air entering the passage. Air is adapted to be educted from each such passage through separate air outlet ducts 11, one for each passage, each preferably coextensive in length therewith, and each communicataing with the passage at the one end and communicating at the other end with the flue 3. Each such outlet duct 11 is provided with an adjustable damper 12 for controlling the draft induced by the stack and, therefore, the pressure in the passage from which it leads. The draft causes the flow of a stream of cooling air through each passage 8, quantitatively appropriate for cooling the interior faces of each wall 7 to a temperature sufficient to maintain structural stability of the refractory, without at the same time lowering the temperature of the flame-swept emission surfaces of the wall below the temperature of the opposite emission surfaces and below that at which their effectiveness as heat radiating surfaces would be materially reduced. By proper adjustment of the set of dampers 10 and 12 for each passage, the pressure differential between the air inlet and air outlet ends of the passage 8 may be maintained small and preferably just adequate to maintain the quantitatively appropriate flow of the cooling air stream, and the average pressure differential between the passage 8 and the combustion chambers 2 on each side thereof may also be maintained very small so as to minimize intercommunicating flow of gases through the relatively porous refractory walls 7, which would adversely affect operation of the furnace either by undesired cooling of the hot radiating surfaces, or by excessive heat loss to the cooling medium.

Separate upright banks of tubular heating elements 13 adapted to be heated mainly by radiant heat, are disposed, one bank in each combustion chamber 2, so as to be subjected therein to intense radiant heat from the opposite emission surfaces 16 of the combustion chamber. The surfaces 16 of these walls in each chamber serve to emit intense radiant heat to the elements 13 to which end, burners 14, preferably adjustable as to flame length and direction, are disposed in parallel rows of firing ports 15 formed in the combustion chamber floor, one row on each side of the radiant heating bank. The burners 14 are adapted to project a combustible fuel-air mixture angularly against and upwardly all along the emission surfaces 16 of each combustion chamber side wall.

Each radiant heating bank of heating elements 13, as embodied, is supported within the high temperature radiant heating zone constituted by the combustion chamber 2 in which it is located, so as to obtain conditions of even heat intensity on the heating surface, longitudinally and circumferentially, of the elements. As here preferably embodied, each bank of heating elements 13 is disposed substantially midway between the opposing side wall emission surfaces 16 of the combustion chamber. Each bank, as will be seen from Figure 1, is preferably divided into a right-hand grid-like section and a separate left-hand grid-like section comprised each of a suitable number of the heating elements 13, disposed lengthwise of the chamber in vertically, uniformly spaced parallel relation to each other. These sections are relatively vertically offset from each other so that the respective heating elements 13 of each will present a substantially unshielded heating surface to both emission surfaces of the chamber 16. The elements 13 terminate each at their ends in suitable fittings and joints (not shown) serving to connect them in each section preferably for series flow of fluid therethrough from the top, or intake end, of the section, as viewed in Figure 1, to the bottom or outlet end, of the section. These fittings and joints are housed at the respective opposite ends of each radiant heating bank, in header compartments 17, extending from the sides of the furnace, one at each end of each cell. These header compartments serve to shield these fittings and joints from direct and intense radiant heat while permitting the entry of hot products of combustion into the compartments in limited quantity. To these ends, the walls of each cell are apertured to provide, in each, a pair of vertically disposed, narrow, parallel slots 18, each pair of slots connecting the combustion chamber of the cell with the header compartment at the corresponding end of the cell. The tubular elements 13 extend through the slots 18 into the respective compartments 17.

Support for the bank of tubular heating elements 13, in each radiant heating zone, is provided by a plurality of novel and improved tube support means each adapted for the passage of a coolant fluid therethrough functioning to maintain the same at a safe operating temperature. Each tube support means as embodied comprises a plurality of hollow tube hanger units 19 assembled in coaxial aligned relation on a coolant-carrying tube 28, the column thus formed being fixedly supported at its lower end midway between the emission surfaces 16 by the floor of the combustion chamber, and flexibly supported at its upper end in the relatively cool section of the furnace created at the mouth of each flue 3, by reliable means of fixation disposed in said relatively cool section and operative to permit vertical movement of the top of the system while preventing horizontal or gyratory movement of the top of the system. Each such hanger unit is of a configuration providing arms 23 for engaging and holding certain of the heating elements 13 in their desired parallelism.

As here preferably embodied, each tube support column comprises top and bottom hanger units and a plurality of intermediate hanger units 19 assembled, one upon the other. Each hanger unit, as here preferably embodied, is of sectional construction to facilitate assembly and, as may be seen in Figure 3, comprises a right-hand and a left-hand section which in assembled relation provide a generally tubular central core 20, preferably insulated on the outside, whose bore extends lengthwise of the column in coaxial alignment with the corresponding bores of preceding and/or succeeding hanger units and is adapted to receive the coolant-carrying tube 28.

The intermediate hanger units 19 each have half sections of identical construction including oppositely extending side bolting flanges 21; end bolting flanges 22; and, hanger arms 23 by and/or upon which the tubular elements 13 are held in position. The side bolting flanges permit of the bolting or other releasable securing of the half sections into firm releasable engagement with each other. Likewise, the end bolting flanges permit of the bolting or other releasable securing of each hanger unit to the preceding and/or succeeding unit, to form a unitary column of any desired length. However, in order to obtain the desired vertically staggered relation between the right-hand and the left-hand sections of the radiant tube bank, these hanger sections are assembled in vertically offset relation to each other with a resultant stepped arrangement of their end bolting flanges 22 at both ends.

The bottom hanger unit 19 has its half sections of identical construction except that the right-hand section, as viewed in Figure 3, is, in this case, of greater length at what corresponds to its bottom end. Each half section includes the side bolting flanges 21 (not shown); an end bolting flange 22; and, hanger arms 23. In assembling the sections, the end bolting flanges 22 at what corresponds to the bottom end, as viewed in Figure 3, are aligned in side-by-side relation so as to provide a broad and ample foundation by which the hanger unit is supported on the floor of the combustion chamber and to which it is preferably firmly secured by means of bolts (not shown). Thus assembled, the sections overlap at the opposite (upper) end by an amount equal to the excess length of the right-hand section, thereby to provide a stepped arrangement at the upper end in matching relationship to that of the first intermediate hanger unit mounted thereon and bolted thereto.

The top hanger unit 19 also has its half sections of identical construction, except that the left-hand section, as viewed in Figure 3, is, in this case, of greater length (corresponding to the excess in the bottom hanger) at what corresponds to its top end. Each section includes side bolting flanges 21; and end bolting flanges 22 at its bottom end only; and, hanger arms 23. The sections are assembled to effect alignment of their top ends with consequent stepped arrangement of their bottom ends to match the stepped arrangement of the topmost intermediate hanger unit. A slot 24 formed in the core 20 of the top hanger unit at its top extends from side to side transversely in a direction to receive a tube sheet 25 disposed in the mouth of the flue 3, the slot 24 being of a depth to permit substantial vertical expansion of the hanger assembly.

The hanger arms 23 of the respective hanger units 19 are each preferably provided with a curved surface portion 26 for engaging and conforming to the surface of the tubular element with which it is to be associated. Moreover, as will be apparent from Figure 3, the arms of the respective sets of arms, right-hand and left-hand, are disposed and arranged on the respective hanger units so that, starting with the bottom arm, as viewed in Figure 3, the curved surface portions 26 will lie alternately under and over the tube elements. Spacer members 27 disposed between the tube elements at suitable longitudinal intervals function to maintain the tubes of each pair pressed snugly against the upper and lower hanger arms.

It will be understood that as many tube support columns are provided as are necessary to prevent sagging of the tube elements, having regard to the overall span of the tube elements. In Figure 4, two such columns are shown, but the provision of a greater number is contemplated for cells of greater length.

The coolant tubes 28, one for each tube support column, extend each through a separate aperture 29 in the floor of each cell, and through the bore of the tubular core 20 of the column, in a sliding fit therewith to facilitate heat flow. An opening 30 of relatively large area in one side of the top hanger unit 19 of the column is provided for the exit of the tube from the bore. Each such coolant tube serves to coaxially align the hanger units 19 of the column and is adapted to be supplied at its bottom end with water or other suitable coolant fluid at a relatively low temperature and to discharge the coolant fluid at its top through a suitable connection to a bank of tubular cooling elements 31 positioned lengthwise of each cell 1 in the mouth of the flue 3, there being one such bank in each flue. The coolant fluid serves to maintain the hanger units 19 at a safe operating temperature and thereby prevent their partial or complete structural failure or collapse under the high temperature operating conditions.

Each bank of tubular cooling elements 31 is supported at suitable intervals along its length, by the vertically disposed tube sheets 25, depicted in Figures 3 and 4. Each such bank, which will be hereinafter referred to as a convection shield bank, serves to remove heat in proper amount from the combustion gases leaving the high temperature radiant heating zone and thereby reduce their temperature prior to their contacting a convection heating bank of tubular heating elements 32, disposed in the flue 3. In this manner a proper balance is effected between convection and radiant heating surface under conditions where the transfer temperature between these surfaces, of the fluid being processed, is low, and a high furnace efficiency is obtained at the same time.

Each such convection shield bank, as embodied, receives the discharge of coolant from all of the coolant tubes 28 in the same cell and is adapted to discharge the heated coolant at an elevated temperature to an external heat recovery system from which the coolant, again reduced in temperature, is preferably returned to the inlet end of the respective coolant tubes 28. As here preferably embodied, and as is depicted in Figure 3, the convection shield bank is divided into a right-hand and a left-hand coil in each of which the tubes are connected by suitable fittings at their ends to provide, preferably, a series flow of coolant therethrough. Suitable connection is effected between the discharge end of the respective coolant tube serving each such coil and the inlet end of the coil and the discharge end of the coil is connected to a header pipe 34 which is common to all the coils and forms part of the external heat recovery system, to be more fully described hereinafter.

The tube sheets 25 are preferably supported at their opposite sides as by means of horizontal girder elements 35 (Figure 3) of an external structural steel framework which also includes uprights 35' as well as other framing elements (not shown) from which the individual cells and cell superstructures forming the flues 3, are hung in a manner which will be obvious to those skilled in the art.

Means are provided in the relatively cool throat of the flue 3 for fixing the tube support means constituted by the columnar assembly of hangar units 19, against any substantial gyratory movement at its top while permitting substantially free lengthwise expansion and contraction of the assembly due to temperature changes. The embodied means of fixation is in the form of a sliding connection between the tube sheet 25 and the top hangar unit 19 of the tube support means. As here preferably embodied, the tube sheet 25 for each column is located directly thereabove, so that its bottom edge will be lodged in the slot 24 of the top hangar unit. The depth of the slot 24 is sufficient to permit the hangar unit assembly in expanding axially to move substantially relative to its associated tube sheet 25. Lugs 36 integral with the tube sheet 25 are disposed in pairs, one pair at each side of the tube sheet, so as to slidably, loosely engage the free end of the top hangar unit at opposite sides. The lugs 36 together with that portion of the tube sheet disposed in the slot 24 effectively prevent any gyration of the top of the tube support means, but do not interfere with axial movement of expansion and contraction.

The bottom section of each radiant tube bank is preferably shielded from direct radiation from the emission surfaces 16 by a pair of relatively low, refractory walls 37, one at each side of the tube bank, extending the full length of the combustion chamber, which serve to lessen the heat absorption in this section. These walls are preferably of increasing thickness from top to bottom to satisfy the lessened heat requirements as the fluid undergoing treatment approaches the outlet of the bank.

The superstructure forming each flue 3 comprises separate right-hand and left-hand legs, as viewed in Figure 1, which extend each substantially the full length of the cell 1 and are suitably structurally integrated with the roof and end wall structure of the cell defining the combustion chamber 2. The leg portions of each flue are preferably vertically disposed in spaced parallel relation to each other with the right-hand leg disposed above the partition wall 7 of adjoining cells, but in vertically spaced relation to the top of the furnace unit. Both leg portions are connected together at the top of each to provide a continuous passage for the flow of combustion products between the top of the cell and the header connection 5 for that cell. As here preferably embodied, this connection is effected by means of a series of horizontally disposed duct portions 38 which are spaced from each other lengthwise of the cell to provide slots 39 coinciding with the location of the tube supports 25 in which horizontal steel girders (not shown) of the structural supporting framework, are adapted to be disposed to run the full length of the furnace unit for connection to other girders of the framework, such as the uprights 35'. In this way, it is possible to obtain a lower overall furnace height and at the same time facilitate the hanging of the flue superstructure, as well as provide for support of the tube sheet girders 35 from the structural framework.

Convection heating banks comprised each of the tubular heating elements 32, are disposed each in a separate flue 3 preferably with part of the bank in one leg of the flue and the remaining part in the other leg of the flue. The fluid substance to be heated is supplied to each bank in each flue through the separate feed lines 40 which may draw from separate sources of supply in case different fluid substances are to be treated, or as here preferably embodied, draw from a common header 41. The latter arrangement is of particular advantage where the quantity of material to be treated may vary within wide limits and greater or less furnace capacity may be required from time to time. Moreover the arrangement permits of the removal from operation of any cell for repair, reconditioning, replacement of catalyst, or the like without interference with the independent operation of any other cell. The respective parts of the convection heating bank in each flue may form a single continuous coil from which the fluid substance undergoing treatment may be discharged in separate streams to the separate sections of the radiant heating bank. As here preferably embodied, however, the part of the convection heating bank in each leg of the respective flues is divided into two separate coils each having its tube elements 32 connected for series flow of fluid therethrough and each being separately connected as by the separate feed lines 42 to a separate coil in the other leg, for series flow of fluid through the two. Provision is made for separately supplying fluid in separate streams from the respective feed lines 40 to the respective coils in the right-hand leg of each flue through the separate valve-controlled feed lines 43. Likewise, each of the coils of that part of the convection heating bank disposed in the left-hand leg of the flue 3, as viewed in Figure 1, has its discharge terminus connected, as by one of the separate feed lines 44, to a separate one of the sections of the radiant heating bank comprised of the tubular heating elements 13, in the combustion chamber 2. The sections of the latter bank are adapted to discharge the treated fluid at their lower or discharge end as through the separate discharge lines 45. Where each cell is processing the same fluid substance, the discharge lines 45 may be connected to a common outlet header 46 as shown, by which the treated fluid, after quenching, may be conducted to other units for further processing, as required.

The external circulation system for the coolant discharged from the respective convection shield banks preferably comprises the common outlet header 34 for the several cells, by which the heated coolant is conducted in a liquid state to a vessel 47, such, for example, as the reboiler of a distillation column, wherein it is cooled, as by indirect heat exchange with a cooler fluid, to the desired degree and from which it flows through the line 48 to the intake side of a circulating pump 49 by which the coolant is returned, under pressure and in a cooled state, to any one or all of the several coolant tubes 28, through a common header line 50. The coolant tubes 28 are equipped each with a valve 51 for regulating the quantity and flow rate of coolant passing through the coolant tubes at the pump pressure, thus fixing the rate of cooling of the tube supports in the combustion chambers 2. The cooler 47 is preferably provided with a valved cooling coil 52 through which the coolant fluid is caused to flow in transit to the circulation pump. It will be understood that the coolant fluid, as such, may be oil, Dowtherm liquid, or other high boiling substance in case the recovered heat is to be transferred through the coil 52 directly to places of use in the vicinity. On the other hand, the coolant fluid may be water, in case it is desired to recover heat directly in the form of steam. In such case, the vessel 47, omitting the coil 52 will function directly as a flash chamber continuously supplied with fresh water to maintain the surge volume for pump 49.

The invention in its broader aspects is not limited to the specific steps, processes and mechanisms shown and described but departures may be made therefrom within the scope of the accompanying claims without departing from the principles of the invention and without sacrificing its chief advantages.

What is claimed is:

1. In a plural cell furnace unit for the pyrolytic treatment of fluid organic substances, side-by-side heating cells and a flue-gas discharge system including a separate flue for each cell, each said cell providing a separate and independent radiant heating chamber completely separated from each adjoining chamber by a common refractory partition wall having a flame swept emission surface and having a cooling-air passage communicating at its inlet end with the atmosphere and communicating at its outlet end with said flue-gas discharge system at a locus where the flue gas pressure is lower than atmospheric; damper means at the inlet end of each passage and separate damper means at the outlet end of each passage, for controlling the pressure differential between the air-inlet end and the air-discharge end of the passage and for controlling the pressure differential between the passage and the radiant heating chamber at each side thereof; separate means for separately burning a combustible fuel-air mixture in each radiant heating chamber; a radiant heating bank in the radiant heating chamber of each cell, and a convection heating bank in each flue connected to the radiant bank in the chamber from which the flue leads, for series flow of fluid through the connected banks; separate means for separately supplying each convection heating bank with fluid substance to be treated and separate means for separately removing treated fluid substance from each radiant heating bank; means in each radiant heating chamber for supporting the radiant heating bank therein, each said supporting means having provision for the passage of coolant fluid therethrough; a convection shield bank in the flue for each cell to be supplied with coolant fluid which has passed through the supporting means in the radiant heating chamber of the cell; and, means for separately circulating coolant fluid through the supporting means in each cell to the convection shield bank in the flue leading from the cell chamber.

2. The furnace unit of claim 1 in which each cell comprises substantially parallel refractory side walls at least one of which forms the common refractory partition wall, and in which the radiant heating bank of the cell is disposed substantially midway between said walls and extends in substantially parallel relation therewith.

3. The furnace unit of claim 2 in which the burner means for each chamber comprises a row ofof burners in the floor of the cell at each side of the radiant heating bank, each said row being adapted to bathe the side wall on the same side of the bank in flame substantially all along the said wall.

4. The furnace unit of claim 1 in which each flue is constructed and arranged to provide separate, upright and substantially parallel leg portions connected together to provide a continuous passage for the flow of combustion products from the heating chamber from which the flue leads and in which a leg portion of certain of the flues terminates in spaced relation to the top of the partition wall between the heating chamber of the cell from which the flue leads and an adjoining chamber.

5. The furnace unit of claim 4 in which the cooling-air passage in each partition wall communicates at its outlet end directly with the overlying leg portion of the flue.

6 The furnace unit of claim 4 in which the convection heating bank in a flue is disposed part in each leg portion of the flue.

7. The furnace unit of claim 6 in which the parts of the convection heating bank in a flue are comprised each of separate coils, the coils of the respective parts being connected to provide for series flow of a stream of fluid substance through the convection heating bank.

8. The furnace unit of claim 1 in which the radiant heating bank of a cell comprises tubular heating elements parallelly disposed in separate sections in vertically offset relation to each other, each said section having a separate connection for separately transferring fluid substance from said convection heating bank to each section.

9. The furnace unit of claim 1 in which each said coolant fluid conducting means comprises a vertically disposed tube member and in which each said supporting means comprises a plurality of tube hanger units assembled in superposed relation to each other on such tube member in sliding fit relation thereto, each said hanger unit having an apertured core portion through which the tube member passes.

10. The furnace unit of claim 1 in which the supporting means for a radiant bank comprises a column structure by which the tubular heating elements of the bank are carried, said column structure having its top terminus in substantially the mouth of the flue leading from the chamber in which such column is located, said furnace unit including also means in such flue engaging the top of such column fixing said column against any substantial gyratory movement of its top while permitting vertical expansion and contraction of said column with change in temperature.

11. The furnace unit of claim 1 in which the coolant fluid circulating means comprises an external circulating system including a circulating pump.

12. The furnace unit of claim 11 in which said external circulating system includes a heat transfer leg adapted to be supplied with heated coolant fluid issuing from a convection shield bank of the unit and to discharge said fluid to the induction side of the circulating pump.

13. The furnace unit of claim 12 in which said heat transfer leg comprises a flash chamber having provision for the supply of make-up coolant fluid thereto.

14. The furnace unit of claim 12 in which said heat transfer leg comprises an indirect heat exchange device.

15. A furnace unit for the pyrolytic treatment of fluid organic substances comprising side-by-side heating cells and a flue-gas discharge system, each said cell providing a separate and independent radiant heating chamber completely separated from each adjoining chamber by a common refractory partition wall having a flame swept emission surface and having a cooling air passage communicating at its inlet end with the atmosphere and communicating at its outlet end with said flue gas discharge system at a locus where the flue gas pressure is lower than atmospheric; damper means at the inlet end of each passage for controlling the quantity of air flowing therethrough and separate damper means at the outlet end of each passage for controlling the pressure differential between the air inlet end and the air discharge end of each passage and for controlling the pressure differential between each passage and the radiant heating chamber at each side thereof.

16. A furnace unit for the pyrolytic treatment of fluid organic substances comprising means forming a radiant heating chamber; a radiant heating bank in said chamber; means in said chamber for supporting said radiant heating bank comprising separate hanger units each having an aperture, said hanger units being superposed one upon the other with their respective apertures in coaxial alignment to provide a vertically positioned hollow column assembly, said column assembly being supported at the bottom with each hanger unit in contact with and supported by the hanger unit below it; and, means for conducting coolant fluid through the interior of said column assembly comprising a tube member extending through said aligned apertures in substantially sliding fit relation to said hanger units.

17. A furnace unit as in claim 16, including means for restraining said column assembly at its top against gyratory motion while permitting expansion and contraction of said column axially of said tube member.

HERMANN C. SCHUTT.

REFERENCES CITED

The following references are of record in the file of this patent:

UNITED STATES PATENTS

| Number | Name | Date |
|---|---|---|
| 1,124,529 | Rudd | Jan. 12, 1915 |
| 1,612,266 | Cross | Dec. 28, 1926 |
| 1,622,303 | Wyld et al. | Mar. 29, 1927 |
| 1,857,364 | DeRachat | May 10, 1932 |
| 1,908,374 | Lucke | May 9, 1933 |
| 1,973,533 | Keranen | Sept. 11, 1934 |
| 2,015,328 | Wood | Sept. 24, 1935 |
| 2,029,293 | Alther | Feb. 4, 1936 |
| 2,105,500 | Parsons | Jan. 18, 1938 |
| 2,328,039 | Toomey et al. | Aug. 31, 1943 |
| 2,346,384 | Mekler | Apr. 11, 1944 |
| 2,373,059 | Smith et al. | Apr. 3, 1945 |